US009367488B1

(12) United States Patent
Ardalan

(10) Patent No.: US 9,367,488 B1
(45) Date of Patent: Jun. 14, 2016

(54) SYSTEM ON A CHIP (SOC) RHBD STRUCTURED ASIC

(75) Inventor: Sasan Ardalan, Albuquerque, NM (US)

(73) Assignee: Microelectronics Research Development Corp., Colorado Springs, CO (US)

(*) Notice: Subject to any disclaimer, the term of this patent is extended or adjusted under 35 U.S.C. 154(b) by 80 days.

(21) Appl. No.: 13/288,955

(22) Filed: Nov. 3, 2011

Related U.S. Application Data

(60) Provisional application No. 61/409,954, filed on Nov. 3, 2010.

(51) Int. Cl.
*G06F 15/177* (2006.01)
*G06F 13/00* (2006.01)

(52) U.S. Cl.
CPC ..................................... *G06F 13/00* (2013.01)

(58) Field of Classification Search
CPC .................................. G06F 13/00; G06F 13/36
USPC .................................................................. 713/2
See application file for complete search history.

(56) References Cited

U.S. PATENT DOCUMENTS

| 3,862,930 | A  | * | 1/1975  | Hughes | 438/199 |
| 6,538,468 | B1 | * | 3/2003  | Moore  | 326/40  |
| 2004/0250056 | A1 | * | 12/2004 | Chang  | 713/1   |

OTHER PUBLICATIONS

Fouts et al., "A Microprocessor Interface for Ferroelectric Capacitor Memory," Signals, Systems and Computers, 26th Asilomar Conf. vol. 2 pp. 930-934, Oct. 1992.*

* cited by examiner

*Primary Examiner* — Vincent Tran
(74) *Attorney, Agent, or Firm* — Juneau & Mitchell; Todd L. Juneau

(57) ABSTRACT

This invention relates to both a method and device for booting up a device and online scrubbing utilizing a system on chip appliqué sensor interface module in a Space Plug-and-Play Avionics environment that incorporates Radiation Hardened by Design components.

16 Claims, 16 Drawing Sheets

FIGURE 3

| Item | Pin | DIR | Width | Speed | Description | Connections |
|---|---|---|---|---|---|---|
| 1 | clk | input | 1 | 50 MHz | CPU clock input | |
| 2 | rst | input | 1 | High | Hardware reset input Active High | |
| 3 | asim_spi_mosi | output | 1 | 8 MHz | ASIM SPI MOSI | Connect to SPI NVM MOSI |
| 4 | asim_spi_clk | output | 1 | 8 MHz | ASIM SPI CLOCK (6.25 MHz for EEPROM Bootup and 50 MHz Clock) | Connect to SPI NVM Clock |
| 5 | asim_spi_miso | input | 1 | 8 MHz | ASIM SPI MISO | Connect to SPI NVM MISO |
| 6 | asim_spi_eeprom_sel | output | 1 | 8 MHz | SPI EEPROM Select | Connect to SPI NVM Chip Select |
| 7 | eeprom_test | input | 1 | DC | SPI EEPROM Product ID Test | Set to Low |
| 8 | reload | input | 1 | High | Reload the Block SRAM from SPI EEPROM | Auto Reload on Positive Edge |
| 9 | eeprom_load | input | 1 | DC | SPI EEPROM Load (Bootup) | For Auto Reload set to Low |
| 10 | instructionSource | input | 1 | DC | Selects execution from RAM or ROM | For Auto Reload set to Low |
| 11 | speed | input | 1 | DC | Set CPU Speed: 0=50MHz, 1=20MHz | |
| 12 | porBypass | input | 1 | DC | This is the reload by pass. To by pass automatic reload set to high. Otherwise use automatic reload (of SPI NVM). | Set to low for Auto Reload, High for Manual |
| 13 | intcall | output | 1 | 50 MHz | Interrupt in progress signal. Use for Interrupt Acknowledge | Can monitor to see when ISR is executing for Software Reset |
| 14 | test | input | 1 | DC | test input pin. Tied to Exteral SFR. ROM can check to go into test mode or operational mode | Must be set to low so that built in ROM sets up and enables Interrupt 3 |

FIGURE 5

```
Line  I  Addr  Code        Source
 91:                       ;+++++++++++++++++++++++++++++++++++++++
 92:                       ; Write to Program Memory
 93:                       ;+++++++++++++++++++++++++++++++++++++++
 94:
 95:     0036  E5 87       MOV  A, PCON
 96:     0038  F5 90       MOV  P1, A
 97:
 98:     003A  43 87 10    ORL  PCON, #10H    ; set PMW PCON.4
 99:

100:     003D  E5 87       MOV  A, PCON
101:     003F  F5 90       MOV  P1, A
102:
103:
104:     0041  90 10 33    MOV  DPTR, #1033H
105:     0044  74 BC       MOV  A, #0BCH
106:
107:     0046  F0          MOVX @DPTR, A
108:
109:     0047  E4          CLR  A
110:
111:     0048  93          MOVC A,@A+DPTR
112:     0049  F5 80       MOV  P0, A
113:
114:     004B  E5 87       MOV  A, PCON
115:     004D  F5 90       MOV  P1, A
```

FIGURE 11
XCFxxS and XCFxxP PROM as Configuration Slave with CLK Input Pin as Clock Source
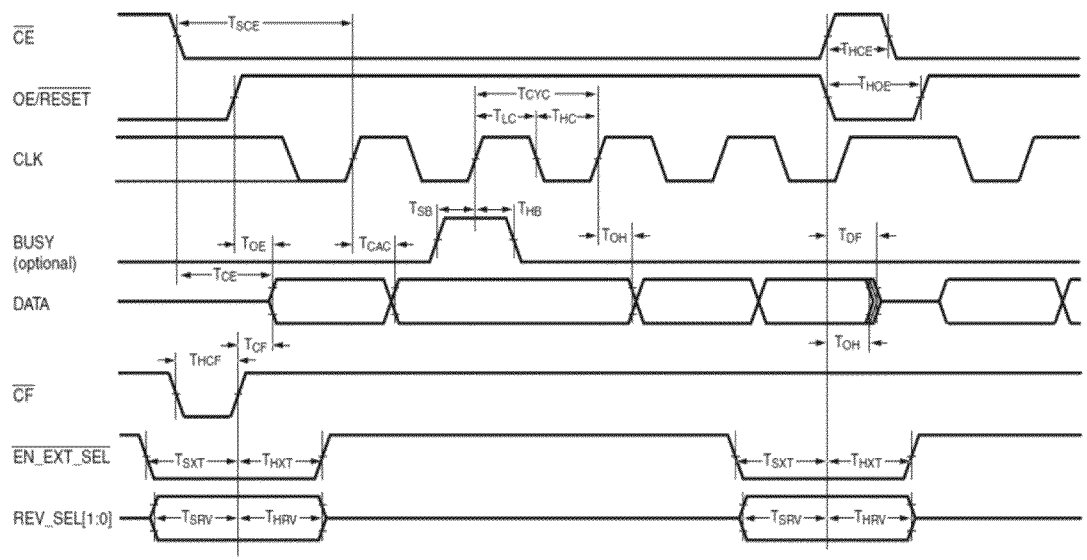
ATMEL AT25FS010
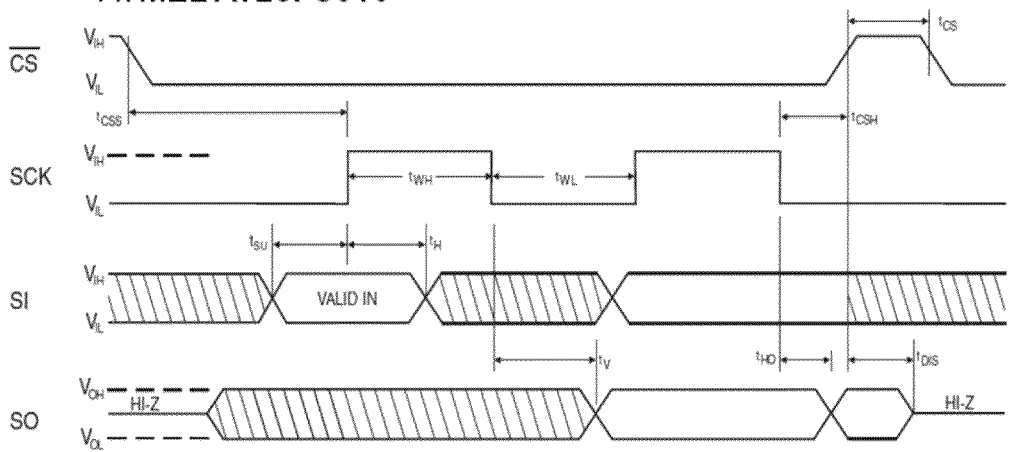

SYSTEM ON A CHIP (SOC) RHBD STRUCTURED ASIC

CROSS REFERENCE TO RELATED APPLICATIONS

This application claims priority under 119(e) to U.S. Provisional Application No. 61/409,954, filed on Nov. 3, 2010 the contents of which is incorporated herein by reference in its entirety.

STATEMENT REGARDING FEDERALLY SPONSORED RESEARCH OR DEVELOPMENT

This invention was made with government support under a phase II SBIR Enhancement (FA9453-09-C-0012) awarded by AFRL. The government has certain rights in the invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

This invention relates to Appliqué Sensor Interface Modules (ASIMs) used in a Space Plug-and-Play Avionics (SPA) setting.

BACKGROUND OF THE INVENTION

Appliqué Sensor Interface Modules (ASIMs) provide a convenient implementation of the Space Plug-and-Play Avionics (SPA) standard for common spacecraft devices. ASIMs simplify the chore of interfacing to SPA by providing automatic support for the low-level physical interface, electronic datasheets, synchronization, and power management. ASIMs have been implemented in an array of technologies, including programmable logic devices.

The SPA approach is part of the Air Force Research Laboratory (AFRL) efforts to streamline satellite design, development, assembly and testing. The implementation of SPA is defined in a series of draft standards maintained by AFRL. SPA is designed as a system of systems using the Plug-and-Play (PnP) principle to interconnect devices across a common network and can be implemented over a variety of physical layers. In the nomenclature of SPA, a SPA-x network is based on the extension of some base physical layer interface technology (x) to accommodate the functions of command, data transport, power and synchronization of any component to a network of similar components. SPA interfaces based on the USB 1.1 standard (SPA-U [1]) and Spacewire standard (SPA-S) have been developed. SPA-U has been demonstrated in sub-orbital and orbital experiments, and an entire spacecraft has been built based on SPA-S. Other research is ongoing to explore SPA-x options for higher speed, lower speed, and wireless applications. Except for the wireless version of SPA, all SPA-x implementations support common power delivery and synchronization through a 1 Hz interface.

Under the SPA approach, a number of components (called SPA devices) are connected together through single point SPA interfaces. A SPA device is any component supporting an embedded SPA interface. Since most legacy components do not natively support SPA, modules referred to as Appliqué Sensor Interface Modules (ASIMs) have been developed as adapters to simplify the concept of legacy conversion, literally changing a non-plug-and-play device into a SPA device. This situation is analogous to devices built for personal computers that employ USB interface components to launder custom circuitry of commodity components (e.g. mice, keyboards) into a universal, plug-and-play format. Since aerospace systems often employ custom operating systems, the notion of an electronic document called the "eXtensible Transducer Electronic DataSheet" (xTEDS) has been adopted to facilitate a "driver-less" form of plug-and-play.

BRIEF SUMMARY OF THE INVENTION

A method for booting up from serial non-volatile device into a microcontroller or computer with volatile program memory by using or activating only one signal that is a low to high or high to low transition that causes the program code to be copied from serial non-volatile program memory to on-chip volatile program memory.

A method of performing a soft reset of a processor by booting up from serial non-volatile device into a microcontroller or computer with volatile program memory by using or activating only one signal that is a low to high or high to low transition that causes the program code to be copied from serial non-volatile program memory to on-chip volatile program memory.

A method of performing a soft reset of a processor without performing a general reset by booting up from serial non-volatile device into a microcontroller or computer with volatile program memory by using or activating only one signal that is a low to high or high to low transition that causes the program code to be copied from serial non-volatile program memory to on-chip volatile program memory wherein the processor reset is separate from main microcontroller reset.

A circuit for use in a spacecraft capable of booting up from serial non-volatile device into a microcontroller or computer with volatile program memory by using or activating only one signal that is a low to high or high to low transition that causes the program code to be copied from serial non-volatile program memory to on-chip volatile program memory.

A circuit for use in a spacecraft capable of performing a soft reset of a processor by booting up from serial non-volatile device into a microcontroller or computer with volatile program memory by using or activating only one signal that is a low to high or high to low transition that causes the program code to be copied from serial non-volatile program memory to on-chip volatile program memory.

A circuit for use in a spacecraft capable of performing a soft reset of a processor without performing a general reset by booting up from serial non-volatile device into a microcontroller or computer with volatile program memory by using or activating only one signal that is a low to high or high to low transition that causes the program code to be copied from serial non-volatile program memory to on-chip volatile program memory wherein the processor reset is separate from main microcontroller reset.

BRIEF DESCRIPTION OF THE DRAWINGS

FIG. 3 is a table of SOC Pins for NVM bootup and reload.

FIG. 5 is a table showing writing to program memory in the CAST 805 LXC

FIG. 11 is a timing diagram showing the commonality between the Xilnx platform flash and Atmel 1 Mbs SPI flash

DETAILED DESCRIPTION OF THE INVENTION

Definitions

Figure 1:
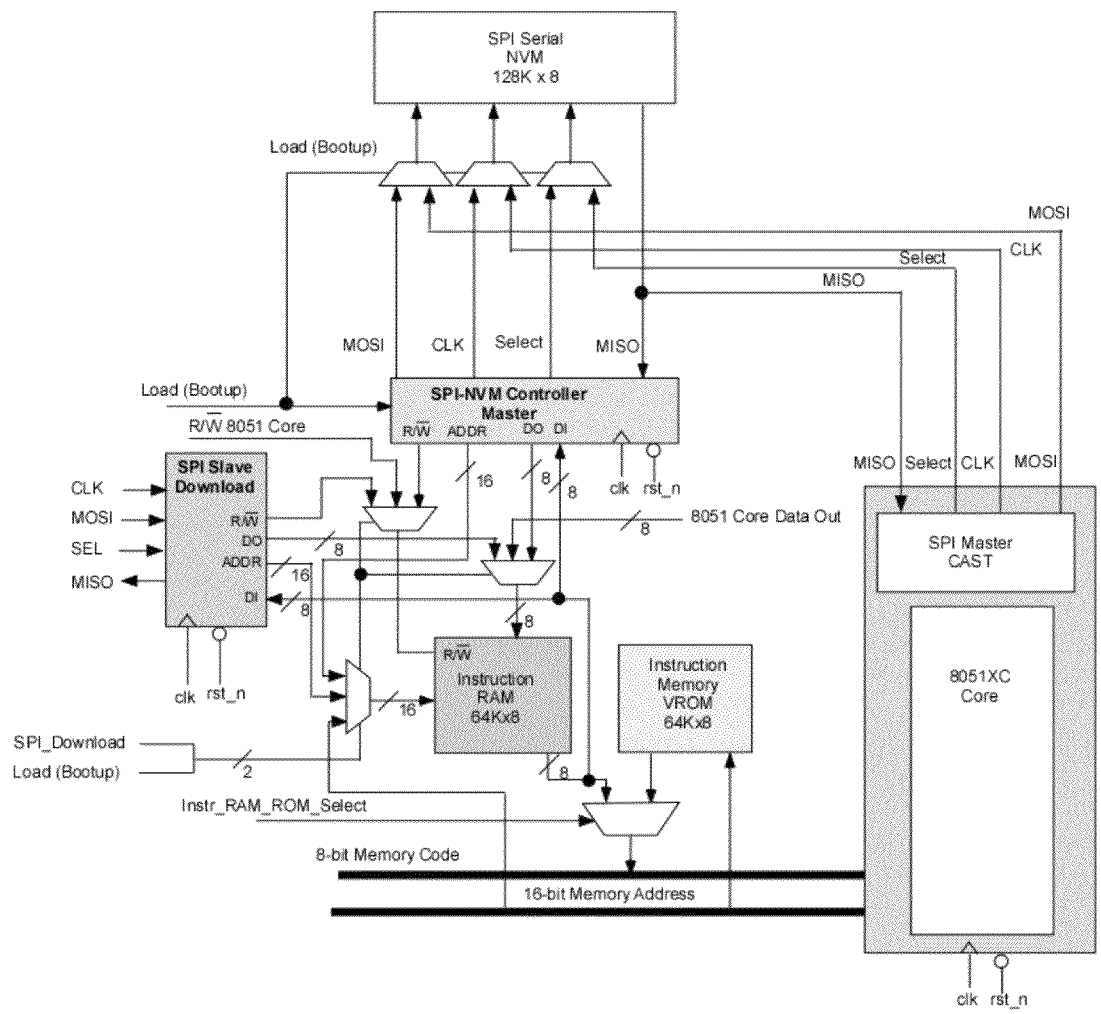
FIG. 1 is a diagram of a SoC chip program memory sub system

The following definitions are provided as an aid to understanding the detailed description of the present invention.
PnP=Plug-and-Play
SPA=Space Plug-and-Play Avionics
S-ASIC=Structured ASIC
RHBD=Radiation hardened by design
XTEDs=Extensible Transducer Electronic Datasheets
SpW=Spacewire
C&DH=Command and Data Handling
Gbps=Gigabits per second
Mbps=Megabits per second
Kbps=Kilobits per second
SDM=Satellite Data Model
ASIM Chip The design specification for the ASIM is based on accumulated experience from previous ASIM generations and focuses on providing a flexible platform with a solid tool chain for software development. The microprocessor picked to fulfill this role is the 8051, widely used commercially. Other important requirements defined are:

1. Support for software debugging.
2. Support for SPA-U and SPA-S Test-By-Pass (TBP) networks.
3. I2C, SPI and RS-422 interfaces.
4. Hardware accelerated functions such as Cycle Redundancy Codes (CRC) and Pulse Width Modulation (PWM).
5. Non Volatile Memory storage for xTEDs and boot code storage.

The overall ASIM system is described using portable RTL code. The 8051XC core was acquired from CAST® Inc. for this specific project. Additional IP cores were acquired from CAST® that were fully integrated into the 8051XC. These included additional serial ports, I2C and SPI Master/Slave Cores and the Power Management Unit (PMU). The system includes a Wishbone crossbar switch as a main interconnection bus. This feature allows the system to scale as the user needs grow, by hanging extra peripherals from this bus. Other peripherals (e.g. CRC core) have a tighter integration with the microprocessor, using free address in the Special Function Registers (SFR) file to reduce access time. The system incorporates block SRAM memory and dual port distributed memory for flexibility of the system's deployment. The on-chip memory is implemented using flip-flops. All flip-flops including registers used in the Special Function Registers are hardened using temporal latch technology3. The ASIM Program RAM (64 Kbytes) uses EDAC protected Static RAMs.

ASIM Chip: Spacewire

The ASIM chip includes a Spacewire CODEC core that is compliant with the ECCSS-E_ST-50-12C standard. The Spacewire Core operates at a top speed of 50 Mbps and supports the default speed of 10 Mbps. The top speed matches the ASIM clock speed of 50 MHz. The Spacewire CODEC is integrated with the 8051XC core.

Prior to tapeout of the ASIM Chip, the Spacewire CODEC and the full ASIM chip were implemented on a Spartan® 3E 1200 Xilinx FPGA running at full speed (50 MHz). The Spacewire CODEC was cross-verified in hardware with the 4Links Spacewire router. A special hardware card with LVDS drivers and receivers was developed called the ASIM daughter card that interfaced to the Digilent® Spartan® 3E FPGA via a 100 MHz Hirose FX-2 connector. On the ASIM chip 1.25 Gbps on chip LVDS drivers and receivers were used so that no off-chip LVDS transceivers are needed resulting in substantial cost savings.

ASIM: Test-Bypass

This core is used to access a section (2 Kbytes) of the processor data memory, allowing an external control (simulation) to provide substituted values during test. Commands are sent to this core following a protocol through an independent RS-422 channel with speeds up to 460 Kbauds. Test-bypass is meant to be used only in a testing environment. Test-bypass is particularly useful in cases where an actual test involving a device's native sensors and actuators is impractical.

ASIM: Non Volatile Memory and Program Code Bootup

The ASIM chip supports bootup of program memory code from external Non Volatile Memory (NVM) via a SPI interface. The chip incorporates a SPI Master that copies 64 Kbytes of program code from the NVM SPI Slave into the on-chip Block EDAC SRAM. The chip also has a SPI Slave that allows program download and upload (for verification) via an external SPI Master. For rapid program development Intel Hex Checksum files (created by the Keil® Program Development system or Macro Assembler) can be downloaded via a USB/SPI interface directly from the PC to the Silicon (or FPGA). The Diolan® I2C/SPI USB Bridge is used to accomplish this task (using their C-API). Through the SPI Master, the 8051XC Core can also read XTEDS from the NVM. In addition, via the Spacewire link, the firmware can be upgraded in the NVM. Finally, using a special feature in the 8051XC Core the data can be written into the Program Memory (Block SRAM) with EDAC protection to harden critical dynamic data.

In both the XC8051, SPA-S, SPA-U, and SPA-1 System on a Chip (SoC) and the PIC based 8 bit RISC SPA-1 SoC [1], program execution is carried out from the on-chip Block SRAM (64 Kbytes). Support for Space Avionics Plug and Play (SPA) systems for Spacewire (SPA-S), USB (SPA-U) and I2C (SPA-1) are provided in the 8051XC based SoC and SPA-1 in the 8 bit RISC SoC. The SoC chips have been taped out using the IBM 90 nm 9LP CMOS Process. The SoC using the 8051XC processor is based on the 7×7 mm full featured Structured ASIC die. It is referred to as the 7×7 SoC. The Structured ASIC fabric uses Radiation Hardened by Design (RHBD) techniques. In particular, temporal latch technology [2] is used to mitigate SEU. For the Block SRAM, which is organized as eight 8K×8 structures to provide 64 Kbytes of SRAM, EDAC protection is provided in the RHBD process which incorporates special design features resulting from radiation testing. These design techniques mitigate SEU, SET and TID effects and also eliminate latch-up for SRAM devices fabricated on commercial IC processing.

Figure 17:
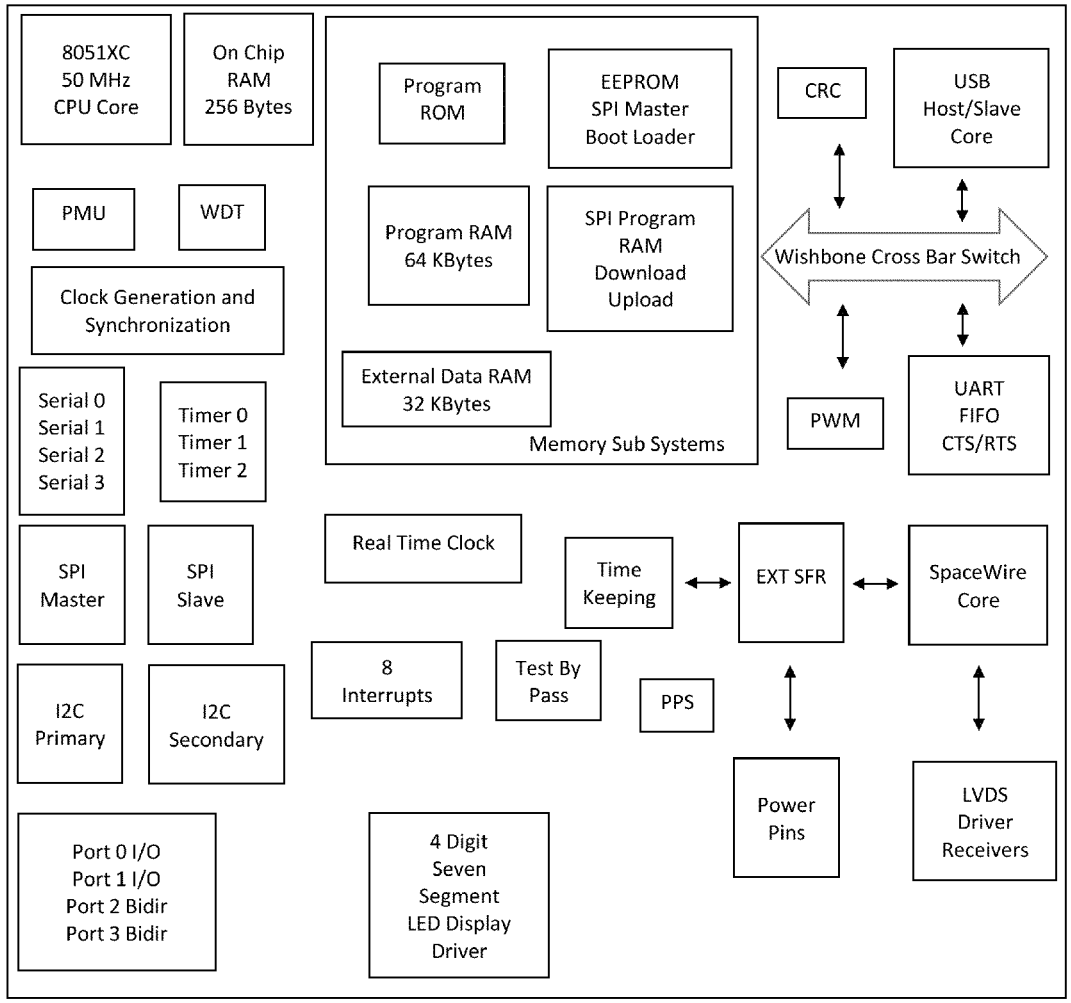

The block diagram of the ASIM chip is shown in FIG. 17. For the highest speed performance, program execution is carried out using the on-chip 64 Kbyte block SRAM. A key issue that is addressed in the design is the transfer of the 64 Kbytes from an external Non Volatile Memory (NVM) device to the on-chip Block SRAM for execution. Since programs are run at full speed from the on-chip block SRAM, a high-speed bus is not required for downloading the external NVM into the block SRAM. For this reason and to save on the pin count, which is a major factor, a Serial Peripheral Interface Bus (SPI) is used to connect to the external NVM. SPI offers a number of advantages, in particular, full duplex operation and speeds up to 50 Mbps. At present radiation hardened parallel EEPROMs exist. These can be converted to support a SPI interface with a RHBD 3×3 mm Structured ASIC chip. Rad-Hard NVM with SPI interfaces are also possible. The approach described here can also be used to bootup from Rad Hard Xilinx PROMs.

On Demand On-Line Scrubbing

In radiation environments, it is required to scrub the on-chip block SRAM on a periodic interval even though the on-chip block SRAM is EDAC protected. A new technique has been developed where this is accomplished using a single reload signal. The signal can arrive at the SoC chip asynchronously as its low to high transition is synchronously detected. The reload signal can be generated from a host controller on the Satellite or a GPIO pin can activate it via the ASIM module. The various methods to copy into and execute code from Block SRAM for the SOC chip are shown in FIG. 1. There are two mechanisms to down load program code from external sources to the Block SRAM. One method is through a SPI download via a USB/SPI bridge. For this purpose a SPI Slave has been implemented in the chip. The second and more significant method is to copy program code from an external Non-Volatile Memory (NVM) chip, for example an EEPROM, via a SPI interface. In this case, a SPI Master controller has been implemented in the chip that can copy program code to the on-chip Block SRAM. This procedure is the main method for copying code into the Block SRAM in the Satellite environment. To this end, the SOC CHIP supports a manual boot-up mode and an automatic on-demand reload mode.

Figure 2:
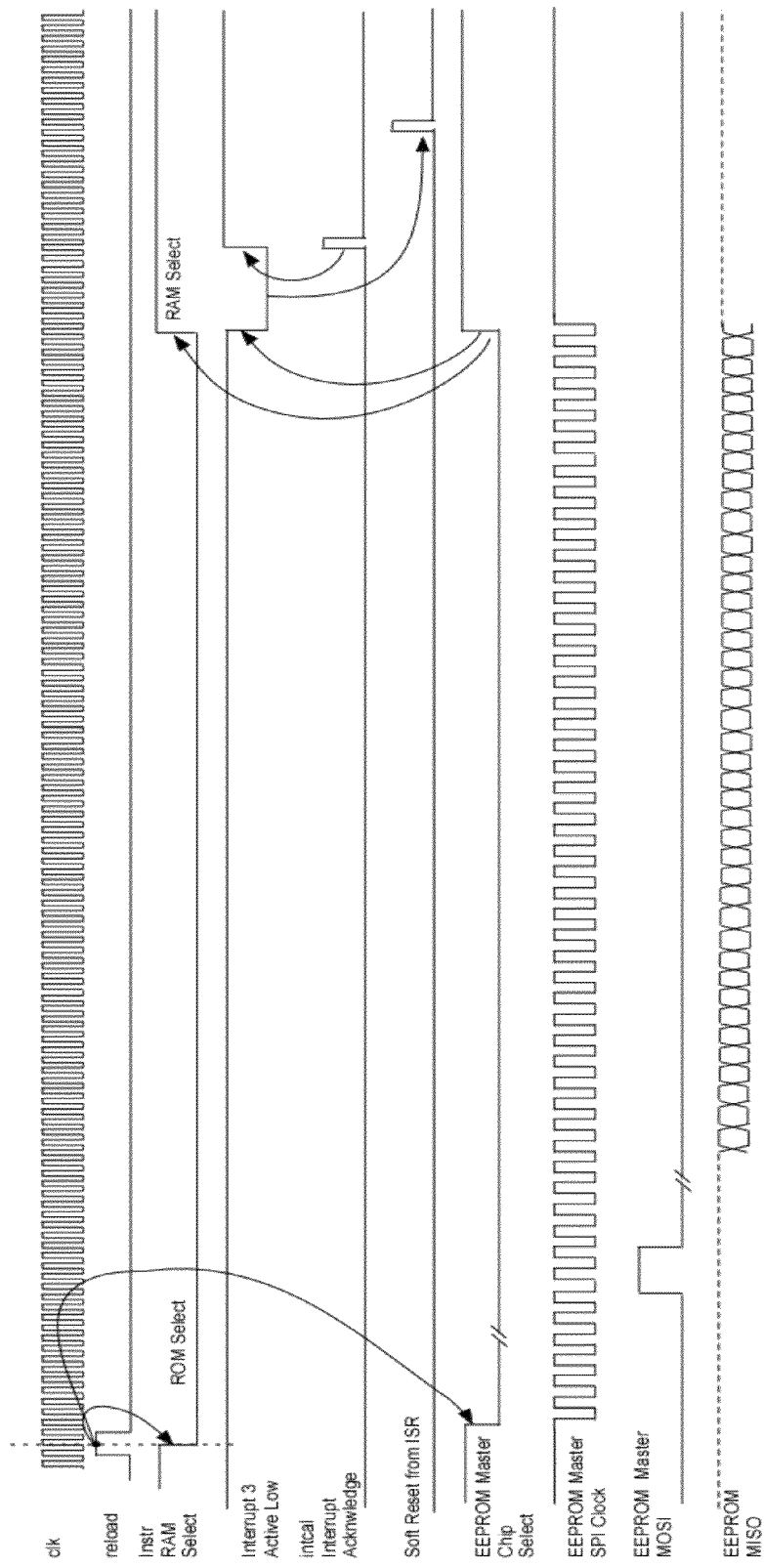
FIG. 2 is a diagram showing on-demand, on-line scrubbing timing

The new technique to support on-demand on-line scrubbing takes advantage of the availability of soft reset in the 8051 CAST core (see FIG. 17). Through software, a soft reset can be generated to reset the CPU (program counter starts at 0). A ROM was developed, which enables external interrupt 3 and sets up an Interrupt Service Routine (ISR) that performs a soft reset. Thus, a single control signal is used to reload and to initiate a scrubbing of the Block SRAM code by copying the code from the EEPROM (NVM) via the SPI into the Block SRAM. The reload low to high transition is synchronously detected and starts the process. During the copying process, the internal ROM is selected for execution so that code in Block SRAM, which is being updated, is not executed. After the code has been copied, the Block SRAM is selected for execution, but simultaneously, the external interrupt 3 line is activated. Since the downloaded code from the EEPROM contains an Interrupt Service Routine for Interrupt vector 3, and the ROM enabled Interrupt 3, this ISR does a soft reset and this results in a jump to the ISR and the generation of a soft reset. The downloaded code in the Block SRAM is executed from program counter location 0. The timing waveform for this operation is shown in FIG. 2. Note that the reload signal can be generated from a GPIO using an internal timer so that the scrubbing can happen over a several hour interval. Or, the signal can be activated from a central host controller.

The on-line on-demand scrubbing scheme has been implemented on the Xilinx Spartan 3E FPGA and a Daughter Card that supports a 128K×8 SPI based NMV chip. The FPGA implementation runs at the full operating clock speed of 50 MHz. The design has been verified in Silicon for the 7×7 mm FF Structured ASIC SOC chip and 3×3 SoC.

ASIM Pins Description and Connections for Bootup and Reload are shown in FIG. 3.

Using Firmware to Bootup from SPI NVM

Figure 4:
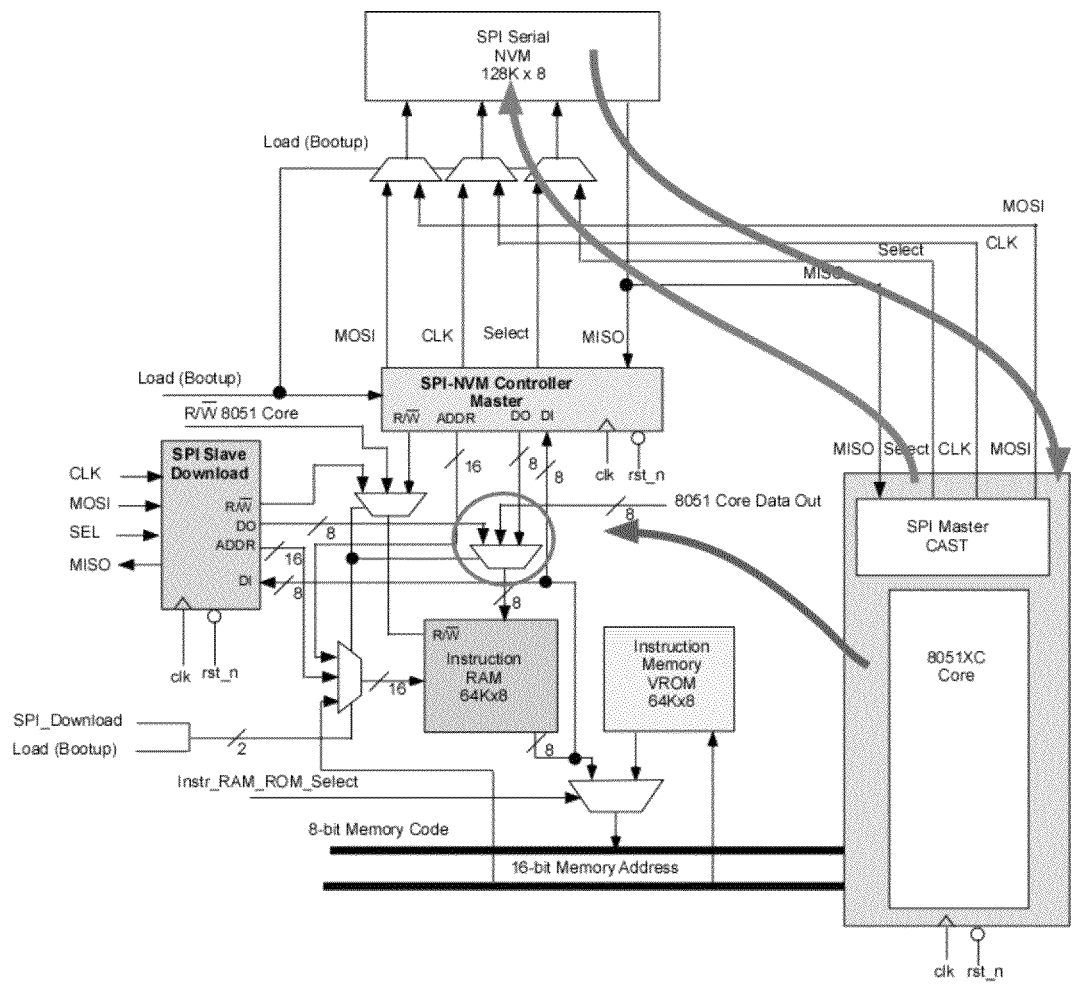
FIG. 4 is a diagram showing SOC flow for copying SPI NVM into instruction RAM
Figure 6:
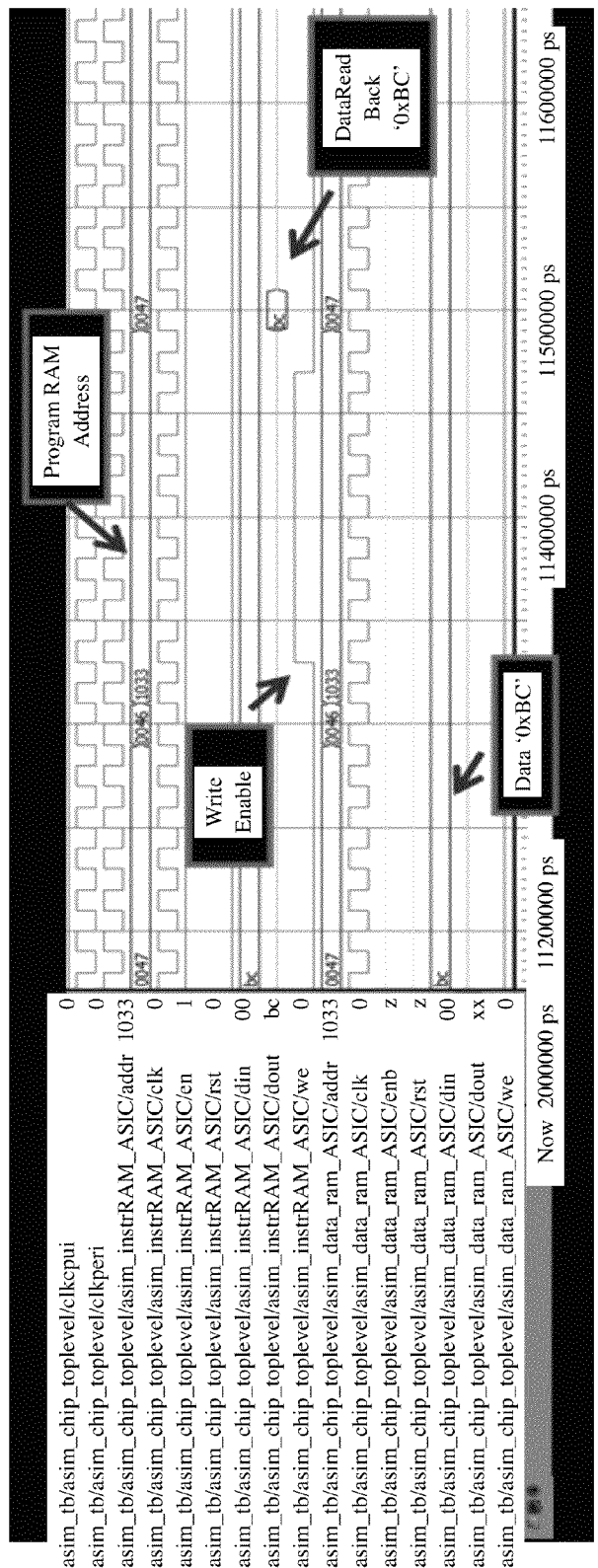
FIG. 6 is a verilog simulation of SOC RTL showing program memory write (the assembly code is shown in FIG. 5)

The SOC has been designed so that the contents of external SPI NVM can be copied into Instruction RAM. FIG. 4 shows the flow for reading data from the external SPI NVM using the CAST SPI Master Core and copying it into Instruction RAM. This flow uses a capability in the CAST 8051XC CPU that provides for writing the Accumulator into Program RAM. The instructions are illustrated in the assembly code shown in FIG. 5. Setting bit 4 in the PCON SFR enables the Write to Program Memory. In the assembly routine, the value 0xBC is written to address 0x1033 in Program Memory (Instruction Memory). FIG. 6 shows the timing diagram verifying the operation with SOC RTL.

Using Firmware to Bootup from SPI NVM: SPI Serial Peripheral Slave Select Register SPSSN To enable the reading of data from the external SPI NVM using the built in SPI Master Core, the spssn SFR and bit postion [0] is used. That is spssn[0]. The spssn SFR is used by the CAST Core to enable up to 8 slave chip selects for the SPI master. spssn[0] is muxed to the external SPI NVM. See FIG. 4.

Using Firmware to Bootup from SPI NVM: ROM Based SPI NVM Bootup

The SOC chip supports direct reading and writing to the SPI NVM via the CAST SPI Master Core and the Slave Selects. Combined with the capability to write into Program Memory (implemented using on-chip SRAM), system designers can use a built in ROM to bootup from external SPI NVM. For example on reset, by examining an external pin, the ROM can copy code into program memory and use a soft reset to bootup.

Using Firmware to Bootup from SPI NVM: Reading XTEDS from External SPI NVM

By providing direct access to the external SPI NVM via the CAST SPI Master Core, designers can read XTEDS (XML based Electronic Data Sheet) from the NVM. In this case, spssn[0] is used as the Slave Chip Select.

SPI Bootup Master Controller

Figure 7:
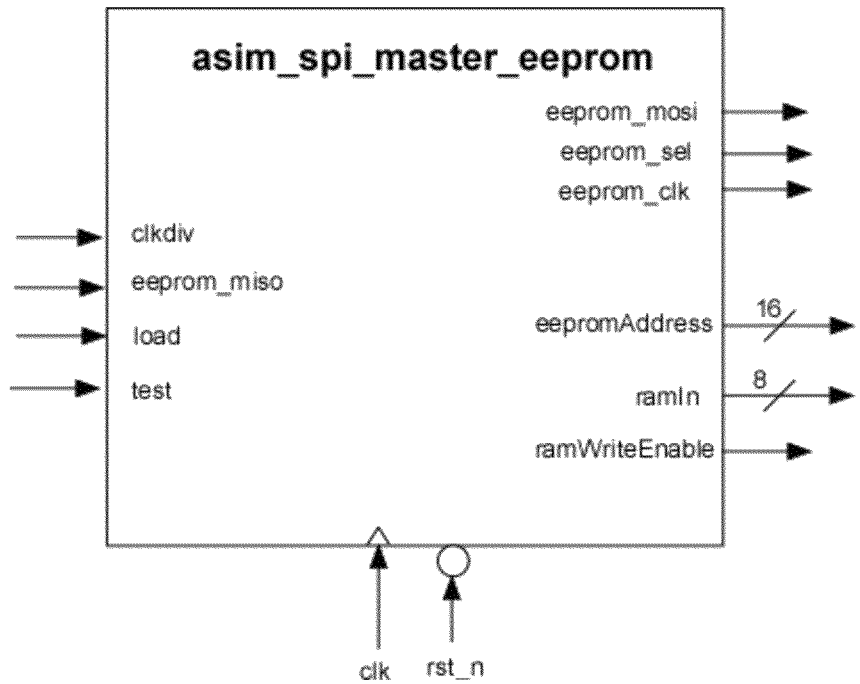
FIG. 7 shows a SPI EEPROM bootup master block

The SPI EEPROM Bootup Master Block is shown in FIG. 7. This block reads 64K Bytes of data from the external SPI NVM staring from address 0x0000. The signal clkdiv is a square wave generated from the CPU clock. It is the clk signal divided by 8. So for a 50 MHz CPU clock it is 6.25 MHz. This is the clock used to clock in data from the external SPI NVM.

The block provides address, data, and write enable signals for the on chip Block SRAM. These are muxed when the SPI Master is Active. See FIG. 1.

Finite State Machine (FSM)

Figure 8:
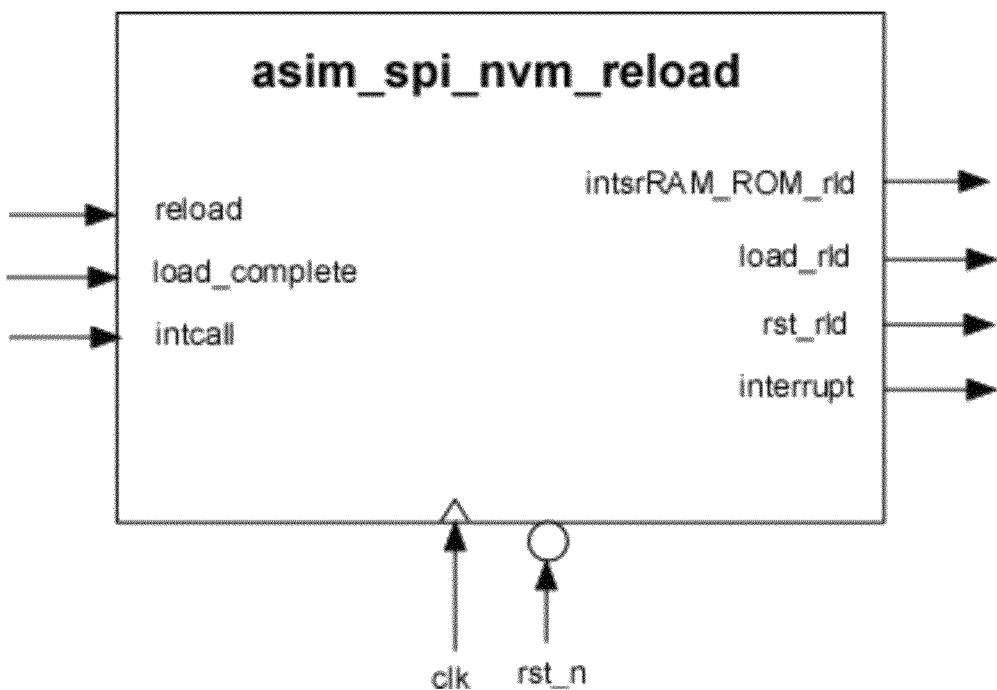
FIG. 8 shows a reload FSM block

The interrupt output signal in FIG. 8 is OR'ed with the External Interrupt 3 if Automatic Reload is active (porBypass is low). Note that load_complete is based on the signal eeprom_sel in the SPI Master Controller, FIG. 7, going high which signals that the SPI Master has completed the copying of 64K Bytes into Program Memory. See the timing diagram in FIG. 2. The signal intcall is generated by the 8051XC and is used as an interrupt acknowledge. It is has a pulse width equal to the clock cycle (clk at 50 MHz). It is used to set the interrupt signal high (disable). Note interrupts are active low. The FSM controls when the RAM or ROM is selected as well as starting the load signal for the eeprom SPI Master controller.

SOC Bootup Capability from Xilinx Radiation Hardened PROM

SOCs with the existing Silicon can boot up from a Xilinx Radiation Hardened PROM. The Xilinx Radiation Hardened PROM has the same slave serial interface as the commercial Xilinx platform flash. This capability is demonstrated using the Xilinx XCF04S platform flash that was programmed using the JTAG interface. C code and Java Code has been developed that converts Intel Checksum linked programs (e.g. from Keil) and programs the Platform Flash through JTAG. The code was programmed into the Platform Flash, and using the 50 MHz SOC RTL, which is exactly what was taped out, copied the contents of the platform flash using the SPI interface into on chip Instruction RAM. Then, using another USB/SPI slave interface, the code in the on chip Instruction RAM was uploaded and verified against the original code. These steps are illustrated in the FIGS. 10-12.

Referring now to the figures, FIG. 1 is a diagram of a SoC chip program memory sub system. The diagram shows the functional orientation of the SPI Serial NVM, SPI Master CAST, and SPI Slave Download. Various methods to copy into and execute code from Block SRAM for the SOC chip are also shown.

FIG. 2 is a timing diagram showing on-demand, on-line scrubbing. The EEPROM Master Chip Select is synced with both the reload and instruction RAM select as well being synced with the interrupt 3 Active Low, which in turn, is synced with the soft reset from ISR.

FIG. 3 is a table of SOC Pins for NVM bootup and reload. There are 14 pins having 50 MHz, 8 MHz, DC or high speed. The connections for the pins are also shown.

FIG. 4 is a diagram showing SOC flow for copying SPI NVM into instruction RAM. The diagram shows the functional orientation of the SPI Serial NVM, SPI Master CAST, and SPI Slave Download.

FIG. 5 is a table showing writing to program memory in the CAST 805 LXC. Lines 104 to 107 have been highlighted to show inventive functionality.

FIG. 6 is a verilog simulation of SOC RTL showing program memory write (the assembly code is shown in FIG. 5). The program RAM address, write enable, data read back "OxBC", and data "OxBC" are shown for clarity.

FIG. 7 shows a SPI EEPROM bootup master block. This diagram shows both incoming and outgoing connections to eeprom and ram devices.

FIG. 8 shows a reload FSM block. Reload and interrupt outputs enable the inventive functionality of this component.

Figure 9:
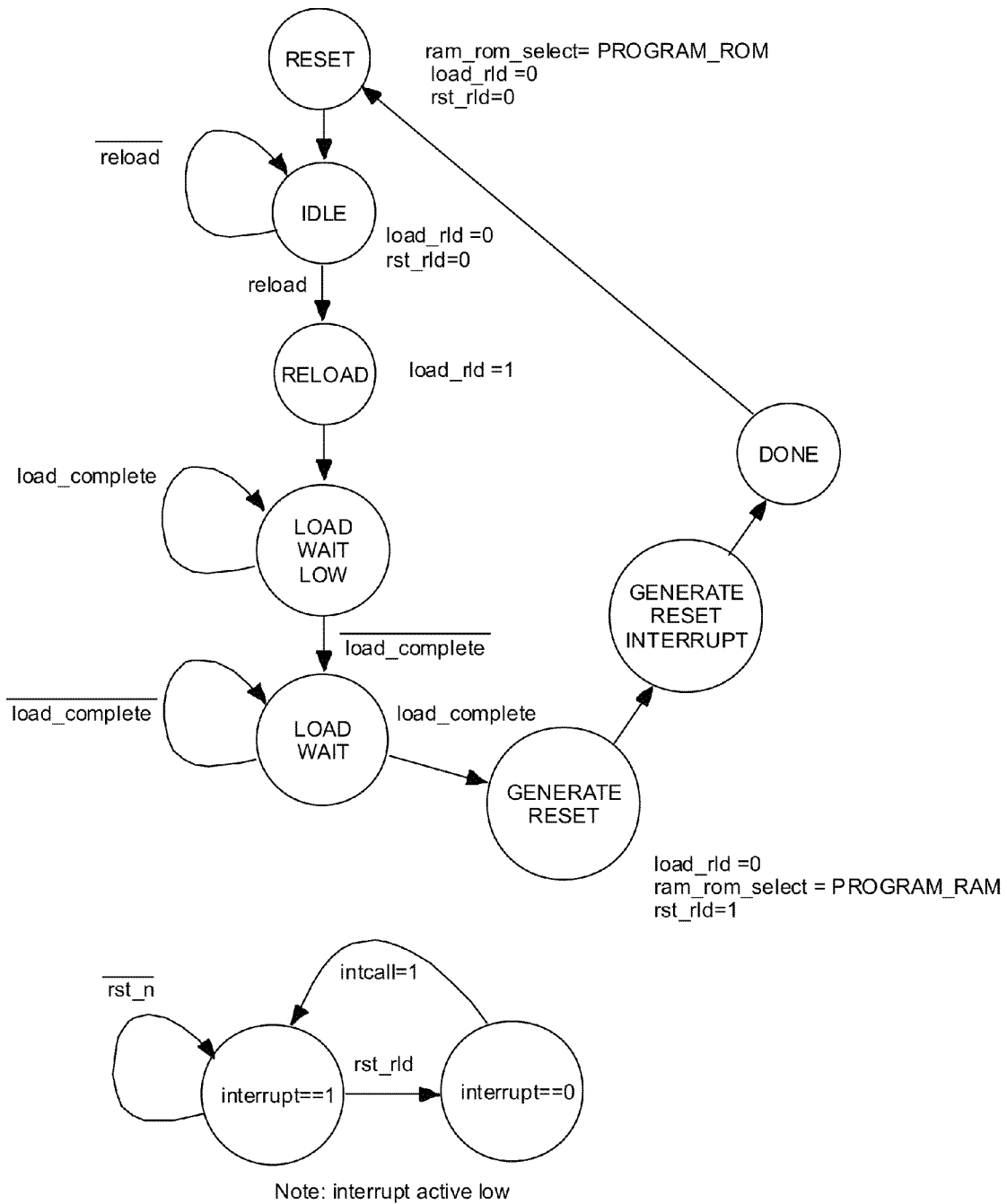
FIG. 9 is a diagram of a reload finite state machine

FIG. 9 is a diagram of a reload finite state machine. The load wait low precedes the load wait and the generate reset precedes the generate reset interrupt. Once the cycle is done it is capable of returning to reset.

Figure 10:
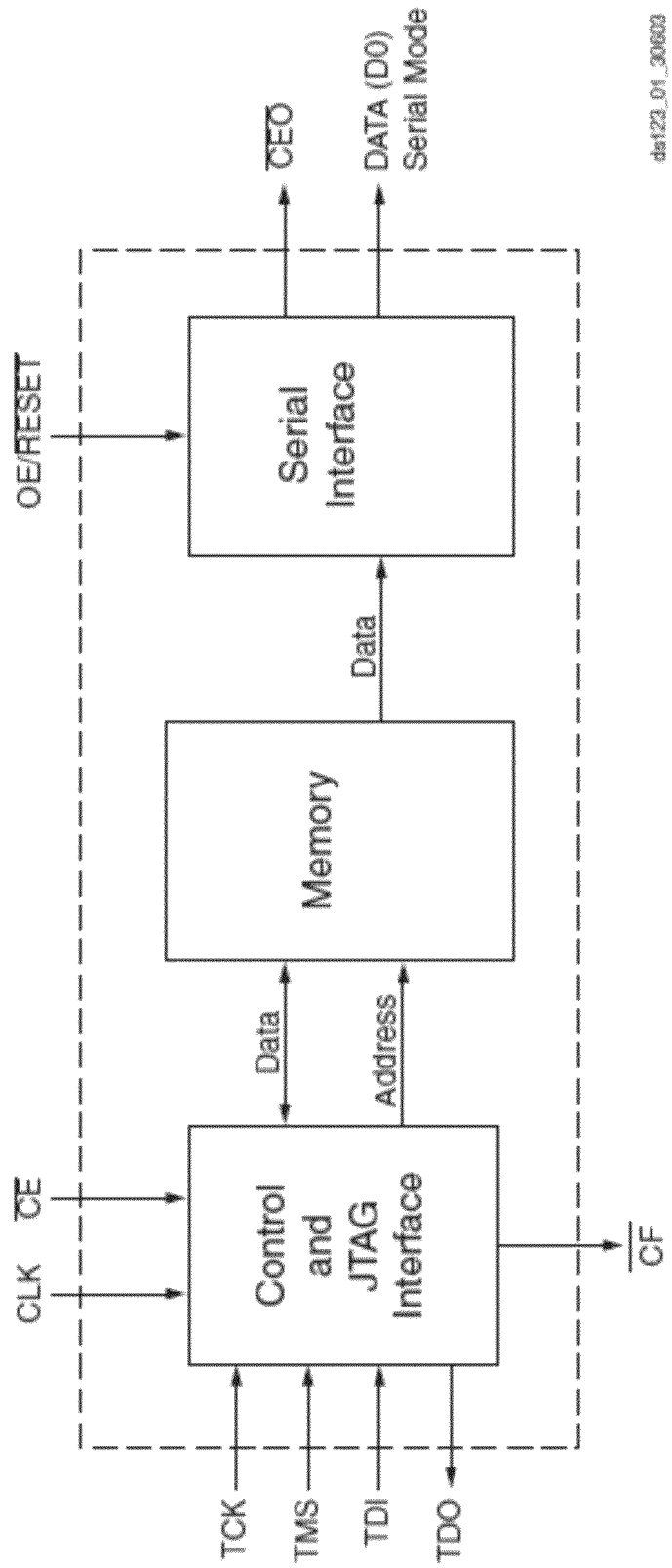
FIG. 10 is a diagram of a Xilinx XCF04S platform flash

FIG. 10 is a diagram of a Xilinx XCF04S platform flash. The Xilinx platform flash has a slave serial interface.

FIG. 11 is a timing diagram showing the commonality between the Xilnx platform flash and Atmel 1 Mbs SPI flash.

Figure 12:
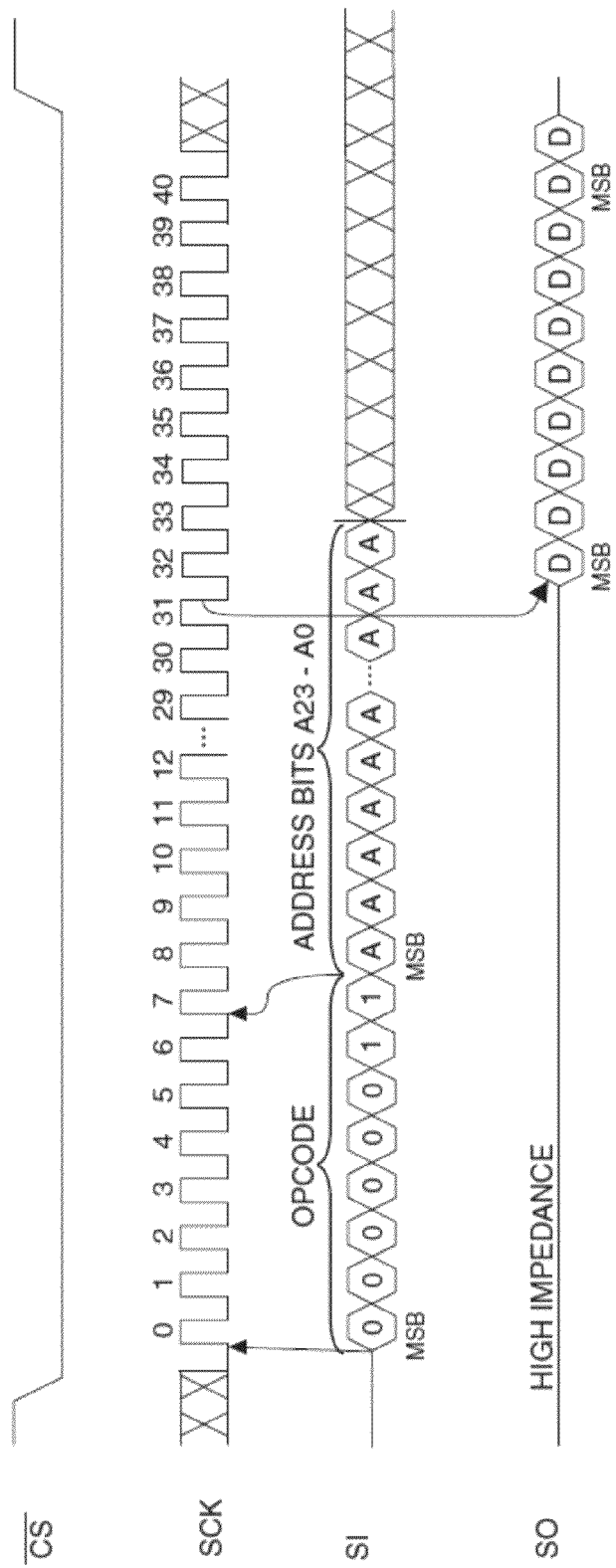
FIG. 12 is a diagram of the Atmel AT25FS010 READ

FIG. 12 is a diagram of the Atmel AT25FS010 READ. The SO has high impedance until SCK 31.

Figure 13:
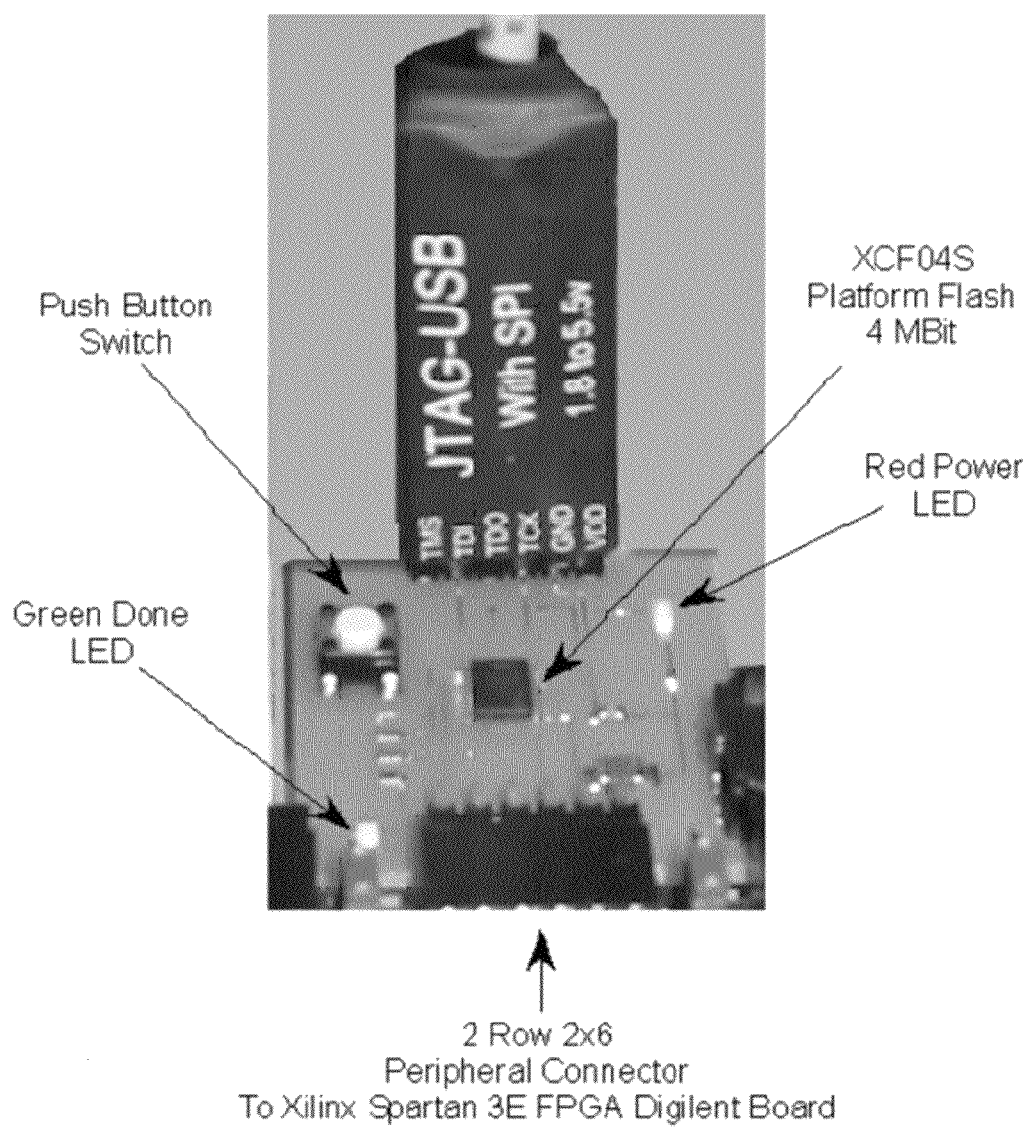
FIG. 13 is a diagram of a Xilinx platform flash PMOD with JTAG programmability

FIG. 13 is a diagram of a Xilinx platform flash PMOD with JTAG programmability. The diagram show the push button switch and has lights indicating power and when it is done.

Figure 14:
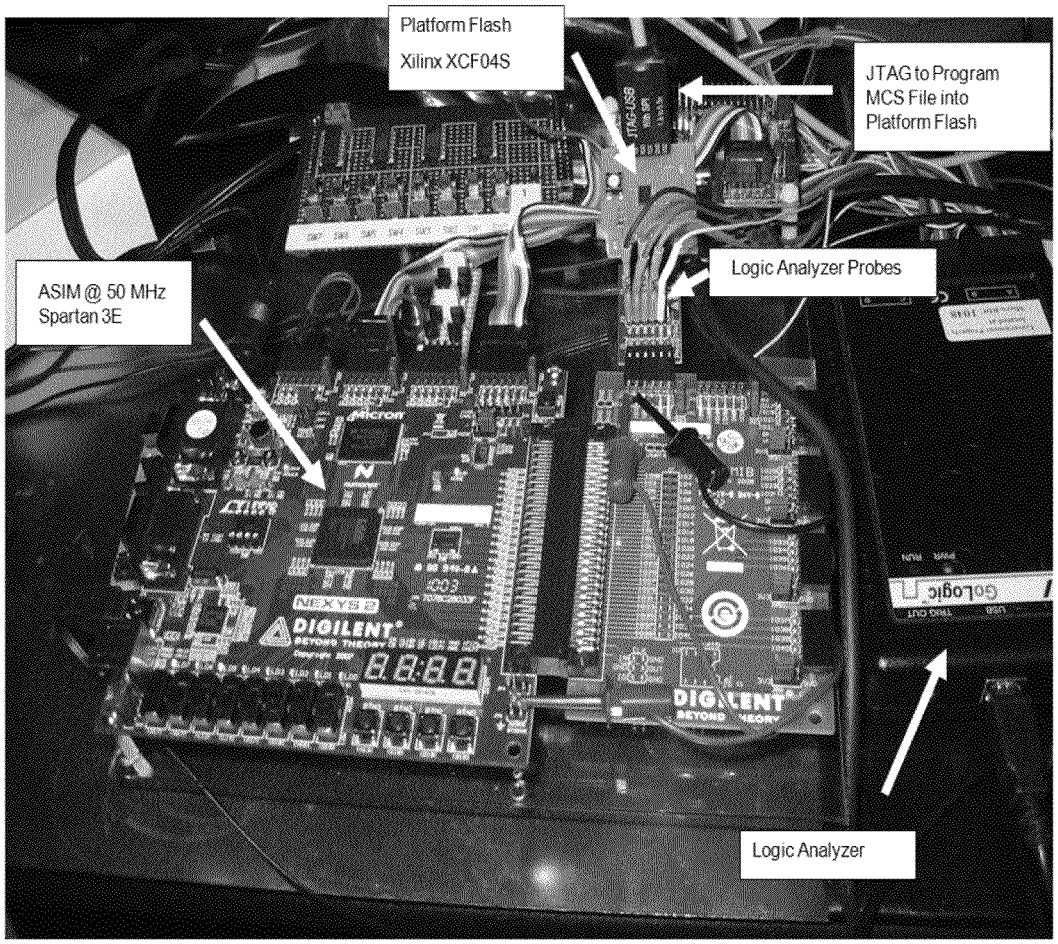
FIG. 14 is a diagram of a SOC FPGA with platform flash bootup

FIG. 14 is a diagram of a SOC FPGA with platform flash bootup. The inventive device is connected to a logic analyzer.

Figure 15:
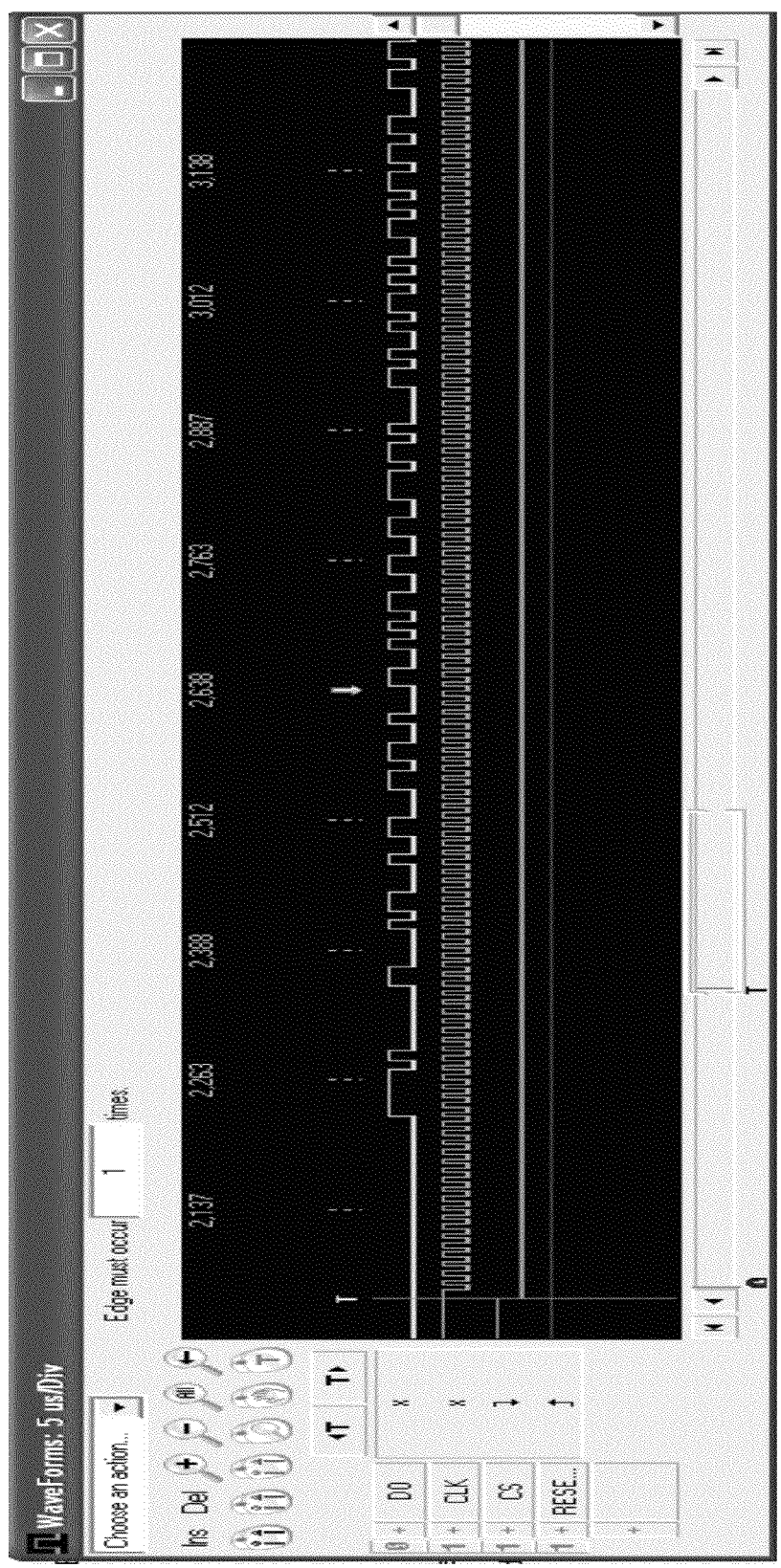
FIG. 15 is a logic analyzer showing bootup from Xilinx platform flash (note after 4th byte FIG. 16 shows uploaded bytes from instruction RAM (using SPI/USB interface and CAPI) with "a", "b", "c" . . . sequence loaded from Xilinx Flash XCF04S FIG. 17 is a ASIM Chip block diagram

FIG. 15 is a logic analyzer showing bootup from Xilinx platform flash (note after 4th byte "a", "b", "c".... The logic analyzer shows the effectiveness of the invention and the functionality of the ASIM.

Figure 16:
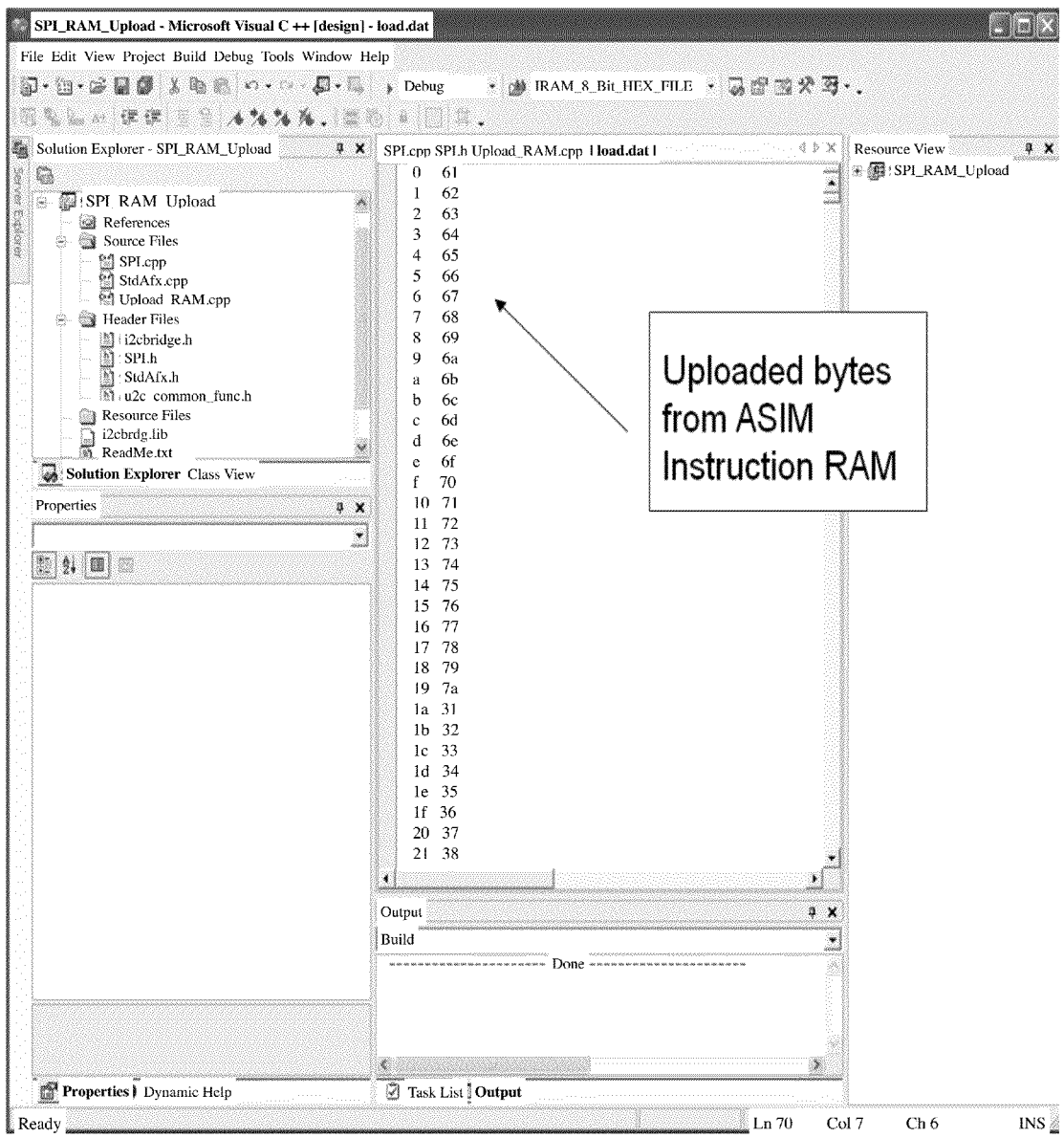

FIG. 16 shows uploaded bytes from instruction RAM (using SPI/USB interface and CAPI) with "a", "b", "c" . . . sequence loaded from Xilinx Flash XCF04S. The number of bytes ranges from 31 to 79 bytes.

FIG. 17 shows a block diagram of an ASIM chip. Program execution is carried out using the on-chip 64 Kbyte block SRAM. A key issue that is addressed in the design is the transfer of the 64 Kbytes from an external Non Volatile Memory (NVM) device to the on-chip Block SRAM for execution.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A method for copying program code from an external serial non-volatile memory device into volatile program memory of an applique sensor interface module (ASIM) on a satellite by using or activating only one signal that is a low to high or high to low transition, the steps comprising:
    generating a signal that is a low to high or high to low transition from a host controller on the satellite or through a general purpose input/output (GPIO) pin connected to an internal timer on the applique sensor interface module (ASIM) on the satellite;
    receiving the signal via a Serial Peripheral Interface (SPI) connection on the ASIM;
    detecting the signal which starts copying program code from the serial non-volatile memory device into the volatile program memory of the ASIM, and which selects an internal read-only memory (ROM) for execution of program code in a local loop during copying of the program code from the external serial non-volatile memory device to the volatile program memory; and,
    generating an interrupt after the program code is copied to the volatile program memory which executes an interrupt service routine (ISR) that selects the volatile program memory for execution after the program code is copied and that performs a soft reset of a CPU of the ASIM and starts program code execution from volatile program memory with program counter at 0.

2. The method of claim 1, wherein the step of detecting the signal which starts copying program code further comprises copying from electrically erasable programmable read-only memory (EEPROM), wherein the EEPROM is the serial non-volatile memory.

3. The method of claim 1, wherein the step of detecting the signal which starts copying program code further comprises copying from flash memory, wherein the flash memory is the serial non-volatile memory.

4. The method of claim 1, wherein the step of detecting the signal which starts copying program code further comprises detecting using a structured application-specific integrated circuit (ASIC) with integrated Block Static Random Access Memory (Block SRAM), and wherein the Block SRAM is protected by error detection and correction (EDAC), wherein the ASIC and the Block SRAM are components of the ASIM.

5. The method of claim 1, wherein the step of detecting the signal which starts copying program code further comprises detecting using a Field Programmable Gate Array (FPGA) with integrated Block Static Random Access Memory (Block SRAM), and wherein the Block SRAM is protected by error detection and correction (EDAC), wherein the FPGA and Block SRAM are components of the ASIM.

6. The method of claim 1, wherein the step of generating an interrupt further comprises execution of program code wherein the volatile program memory runs program code at full CPU speed.

7. The method of claim 6, wherein the full CPU speed is 50 Mhz.

8. The method of claim 1, wherein the step of receiving the signal via a Serial Peripheral Interface (SPI), further comprises receiving the signal at an on-chip SPI Master controller.

9. The method of claim 1, wherein the step of receiving the signal via a Serial Peripheral Interface (SPI), further comprises receiving the signal at an on-chip SPI Slave controller that was generated via an external SPI Master.

10. The method of claim 1, wherein the step of receiving the signal via a Serial Peripheral Interface (SPI), further comprises receiving the signal at an SPI that connects the external non-volatile memory to the volatile program memory which comprises Block Static Random Access Memory (Block SRAM).

11. The method of claim 1, wherein the step of detecting the signal which starts copying program code further comprises detecting on the ASIM, wherein the ASIM is a System on Chip (SoC) comprising a structured application-specific integrated circuit (ASIC) with integrated Block Static Random Access Memory (Block SRAM).

12. The method of claim 1, wherein the step of detecting the signal which selects an internal read-only memory (ROM) for execution of program code uses a ROM that is radiation hardened by using a temporally redundant latch comprising three or more sampling circuits that each sample logic data at different times, and a voting circuit coupled to the sampling circuits that outputs a majority of the samples collected by the sampling circuits.

13. The method of claim 1, wherein the step of detecting the signal which starts copying program code from the serial non-volatile memory device, further comprises copying program code into a Block SRAM that is radiation hardened by using a temporally redundant latch comprising three or more sampling circuits that each sample logic data at different times, and a voting circuit coupled to the sampling circuits that outputs a majority of the samples collected by the sampling circuits, wherein the Block SRAM is the volatile program memory of the ASIM.

14. The method of claim 1, wherein the step of generating an interrupt further comprises the step of performing a soft reset of a CPU of the ASIM without performing a general reset, wherein the processor reset is separate from main microcontroller reset.

15. An applique sensor interface module (ASIM) capable of performing the method of claim 1.

16. An applique sensor interface module (ASIM) for use in a spacecraft capable of performing the method of claim 1.

* * * * *